(12) United States Patent
Johansson

(10) Patent No.: US 10,657,370 B2
(45) Date of Patent: *May 19, 2020

(54) DETERMINING IMAGES HAVING UNIDENTIFIABLE LICENSE PLATES

(71) Applicant: International Business Machines Corporation, Armonk, NY (US)

(72) Inventor: Per Olof Johansson, Sollentuna (SE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/434,657

(22) Filed: Jun. 7, 2019

(65) Prior Publication Data

US 2019/0286903 A1 Sep. 19, 2019

Related U.S. Application Data

(63) Continuation of application No. 15/796,971, filed on Oct. 30, 2017, now Pat. No. 10,360,451, which is a
(Continued)

(51) Int. Cl.
*G06K 9/00* (2006.01)
*G06K 9/62* (2006.01)
(Continued)

(52) U.S. Cl.
CPC ..... *G06K 9/00624* (2013.01); *G06K 9/00671* (2013.01); *G06K 9/033* (2013.01);
(Continued)

(58) Field of Classification Search
CPC ........... G06K 2209/15; G06K 9/00624; G06K 9/00671; G06K 9/033; G06K 9/325; G06K 9/6202; G06K 9/6215
See application file for complete search history.

(56) References Cited

U.S. PATENT DOCUMENTS

| 4,817,166 A | 3/1989 | Gonzalez |
| 6,553,131 B1 | 4/2003 | Neubauer |

(Continued)

OTHER PUBLICATIONS

Amendment filed Jan. 4, 2019 in response to Office Action (dated Oct. 5, 2018) for U.S. Appl. No. 15/796,971, filed Oct. 30, 2017; Confirmation No. 3318.
(Continued)

*Primary Examiner* — Tom Y Lu
(74) *Attorney, Agent, or Firm* — Schmeiser, Olsen & Watts; Mark C. Vallone

(57) ABSTRACT

An approach for processing an image is presented. A category specifying characteristics of a shape of a license plate of a vehicle is determined. Characteristics of objects in the image are determined to match the characteristics of the shape. The image is determined to include the license plate and an identifier. A category specifying characteristics of an order of alphanumeric characters in the identifier is determined. Characteristics of the objects in the image are determined to not match the characteristics of the order of the alphanumeric characters in the identifier and based on the lack of a match, the image is determined to not include an identifiable license plate. Responsive to determining the image does not include the identifiable license plate, the image is determined to be invalid and a manual character recognition process for determining identifiers on license plates is bypassed.

10 Claims, 7 Drawing Sheets

Related U.S. Application Data continuation of application No. 14/805,688, filed on Jul. 22, 2015, now Pat. No. 9,881,211, which is a continuation of application No. 13/860,820, filed on Apr. 11, 2013, now Pat. No. 9,122,928.

(51) Int. Cl.
*G06K 9/03* (2006.01)
*G06K 9/32* (2006.01)

(52) U.S. Cl.
CPC .......... *G06K 9/325* (2013.01); *G06K 9/6202* (2013.01); *G06K 9/6215* (2013.01); *G06K 2209/15* (2013.01)

(56) References Cited

U.S. PATENT DOCUMENTS

| | | |
|---|---|---|
| 8,027,504 B2 | 9/2011 | Simonsson |
| 8,094,887 B2 | 1/2012 | Axemo |
| 8,345,921 B1 | 1/2013 | Frome |
| 8,989,446 B2 | 3/2015 | Kagarlitsky |
| 9,122,928 B2 | 9/2015 | Johansson |
| 9,881,211 B2 | 1/2018 | Johansson |
| 10,360,451 B2 * | 7/2019 | Johansson |
| 2002/0140577 A1 | 10/2002 | Kavner |
| 2009/0208059 A1 | 8/2009 | Geva |
| 2010/0278389 A1 | 11/2010 | Tsai |
| 2011/0084126 A1 | 4/2011 | Fleming |
| 2011/0194733 A1 | 8/2011 | Wilson |
| 2012/0148105 A1 | 6/2012 | Burry |
| 2012/0155712 A1 | 6/2012 | Paul |
| 2014/0307923 A1 | 10/2014 | Johansson |
| 2015/0324654 A1 | 11/2015 | Johansson |
| 2018/0053053 A1 | 2/2018 | Johansson |

OTHER PUBLICATIONS

Amendment filed Mar. 30, 2015 in response to Office Action (dated Feb. 24, 2015) for U.S. Appl. No. 13/860,820, filed Apr. 11, 2013; Confirmation No. 2161.
Amendment filed May 25, 2017 in response to Office Action (dated Mar. 9, 2017) for U.S. Appl. No. 14/805,688, filed Jul. 22, 2015; Confirmation No. 3235.
Mano et al.; Automatic Character Image Sanitizing Method for Optical Character Recognition Data Setup; IP.com Nov. 1, 1994; Retrieved from the Internet Sep. 3, 2012; URL: http://ip.com/Ipcom/000114123; 1 page.
Notice of Allowance (dated Mar. 8, 2019) for U.S. Appl. No. 15/796,971, filed Oct. 30, 2017; Confirmation No. 3318.
Notice of Allowance (dated Apr. 29, 2015) for U.S. Appl. No. 13/860,820, filed Apr. 11, 2013; Confirmation No. 2161.
Notice of Allowance (dated Sep. 13, 2017) for U.S. Appl. No. 14/805,688, filed Jul. 22, 2015; Confirmation No. 3235.
Office Action (dated Feb. 24, 2015) for U.S. Appl. No. 13/860,820, filed Apr. 11, 2013; Confirmation No. 2161.
Office Action (dated Mar. 9, 2017) for U.S. Appl. No. 14/805,688, filed Jul. 22, 2015; Confirmation No. 3235.
Office Action (dated Oct. 5, 2018) for U.S. Appl. No. 15/796,971; filed Oct. 30, 2017; Confirmation No. 3318.
Sun et al.; Image Modality Classification—A Late Fusion Method Based on Confidence Indicator and Closeness Matrix; ICMR '11; Apr. 17-20, 2011; 7 pages.
Zeng et al.; Adaptive Template-matching Method for Recognition of Low-resolution License 2010 IEEE; Dec. 16-18, 2000; pp. 228-233.

* cited by examiner

DETERMINING IMAGES HAVING UNIDENTIFIABLE LICENSE PLATES

CROSS REFERENCE TO RELATED APPLICATIONS

This application is a continuation application claiming priority to Ser. No. 15/796,971 filed Oct. 30, 2017, now U.S. Pat. No. 10,360,451 issued Jul. 23, 2019, which is a continuation application claiming priority to Ser. No. 14/805,688 filed Jul. 22, 2015, now U.S. Pat. No. 9,881,211 issued Jan. 30, 2018, which is a continuation application claiming priority to Ser. No. 13/860,820 filed Apr. 11, 2013, now U.S. Pat. No. 9,122,928 issued Sep. 1, 2015, the contents of which are hereby incorporated by reference.

TECHNICAL FIELD

The present invention relates to a data processing method and system for processing an image, and more particularly to a technique for validating an image based on whether a license plate is identifiable.

BACKGROUND

Current techniques to identify alphanumeric characters on license plates on vehicles use a combination of optical character recognition (OCR) software and manual character recognition (MCR). Using the current techniques with a large number of license plates often results in a major portion of the license plate characters needing to be identified by MCR. A significant number of the license plates that are processed by MCR do not result in identifiable license plate characters. Each image processed by MCR that does not result in identifiable license plate characters either does not include a license plate or includes a license plate that has unreadable characters. Therefore, a large number of images that are processed by MCR results in a waste of human effort because the MCR for those images does not identify license plate characters.

SUMMARY

In a first embodiment, the present invention provides a method of processing an image. The method includes a computer determining a category specifying characteristics of a shape of a license plate of a vehicle. The method further includes based on the category, the computer determining characteristics of objects in the image do not match the characteristics of the shape of the license plate. The method further includes based on the characteristics of the objects in the image not matching the characteristics of the shape of the license plate, the computer determining the image does not include an identifiable license plate. The method further includes in response to the step of determining the image does not include the identifiable license plate, the computer determining the image is invalid and bypassing a manual character recognition process for determining identifiers in license plates.

In a second embodiment, the present invention provides a central processing unit (CPU); a memory coupled to the CPU; and a computer-readable, tangible storage device coupled to the CPU. The storage device includes instructions that are executed by the CPU via the memory to implement a method of processing an image. The method includes a computer determining a category specifying characteristics of a shape of a license plate of a vehicle. The method further includes based on the category, the computer determining characteristics of objects in the image do not match the characteristics of the shape of the license plate. The method further includes based on the characteristics of the objects in the image not matching the characteristics of the shape of the license plate, the computer determining the image does not include an identifiable license plate. The method further includes in response to the step of determining the image does not include the identifiable license plate, the computer determining the image is invalid and bypassing a manual character recognition process for determining identifiers in license plates.

In a third embodiment, the present invention provides a computer program product including a computer-readable, tangible storage device and a computer-readable program code stored in the computer-readable, tangible storage device. The computer-readable program code includes instructions that are executed by a central processing unit (CPU) of a computer system to implement a method of processing an image. The method includes a computer determining a category specifying characteristics of a shape of a license plate of a vehicle. The method further includes based on the category, the computer determining characteristics of objects in the image do not match the characteristics of the shape of the license plate. The method further includes based on the characteristics of the objects in the image not matching the characteristics of the shape of the license plate, the computer determining the image does not include an identifiable license plate. The method further includes in response to the step of determining the image does not include the identifiable license plate, the computer determining the image is invalid and bypassing a manual character recognition process for determining identifiers in license plates.

In a fourth embodiment, the present invention provides a process for supporting computing infrastructure. The process includes a first computer system providing at least one support service for at least one of creating, integrating, hosting, maintaining, and deploying computer-readable code in a second computer system. The computer-readable code includes instructions, where the instructions, when executed by a processor of the second computer system, implement a method of processing an image. The method includes a computer determining a category specifying characteristics of a shape of a license plate of a vehicle. The method further includes based on the category, the computer determining characteristics of objects in the image do not match the characteristics of the shape of the license plate. The method further includes based on the characteristics of the objects in the image not matching the characteristics of the shape of the license plate, the computer determining the image does not include an identifiable license plate. The method further includes in response to the step of determining the image does not include the identifiable license plate, the computer determining the image is invalid and bypassing a manual character recognition process for determining identifiers in license plates.

Embodiments of the present invention employ image recognition software and machine learning to reduce the number of images that need to be processed by manual character recognition, thereby removing unnecessary human intervention and reducing labor costs.

DETAILED DESCRIPTION

Overview

Embodiments of the present invention determine a license plate image is valid or invalid by using image recognition software and machine learning techniques. Embodiments of the present invention improve the determination of invalid license plate images thereby reducing the human effort involved in manual character recognition (MCR) processing. A license plate image is an image captured by a camera as a result of attempting to capture an image of a license plate of a vehicle (e.g., a camera directed at vehicles passing through a charging point or toll station). A valid license plate image is an image that includes a license plate and an entire identifier in the license plate, where all characters in the identifier are recognizable. An invalid license plate image is an image that (1) fails to include a license plate at all; (2) includes a license plate whose identifier has one or more characters that are unrecognizable; or (3) includes a license plate whose characteristics indicate the vehicle to which the license plate is attached is registered in a country, state, province or other governmental jurisdiction that is outside of a specific country, state, province, or governmental jurisdiction, respectively.

System for Determining a License Plate Image is Valid or Invalid

Figure 1:
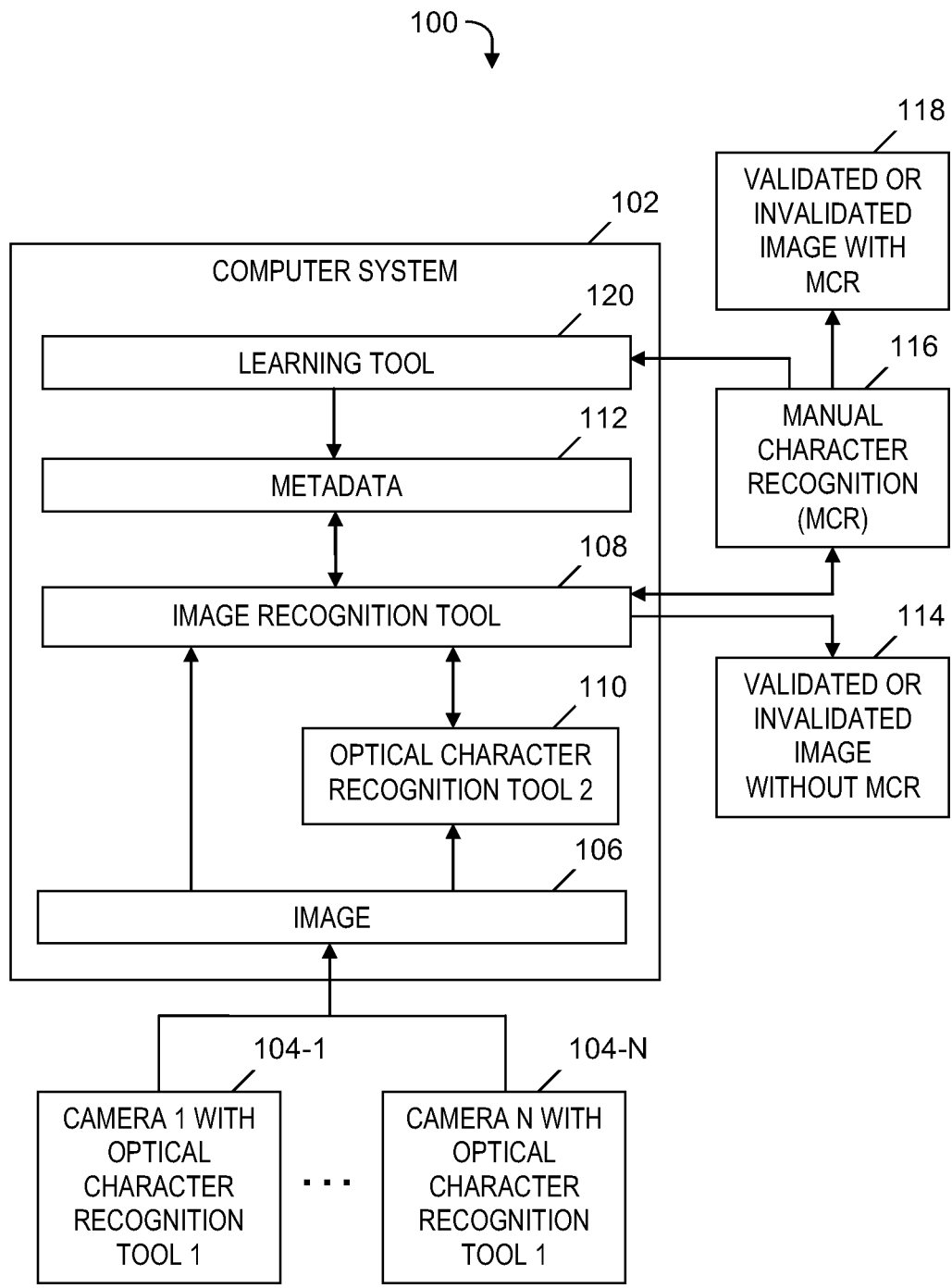
FIG. 1 is a block diagram of a system for determining a license plate image is valid or invalid, in accordance with embodiments of the present invention.

FIG. 1 is a block diagram of a system for determining a license plate image is valid or invalid, in accordance with embodiments of the present invention. A system 100 includes a computer system 102 and camera 104-1 . . . camera 104-N, where N≥1. Cameras 104-1 . . . 104-N attempt to capture images of license plates on vehicles. For example, cameras 104-1 . . . 104-N are cameras attempting to capture images of license plates on vehicles traveling through a charging point on a toll road. One camera included in cameras 104-1 . . . 104-N captures image 106 and sends the image to computer system 102. Each camera 104-1 . . . 104-N includes one or more processors (not shown) that run a first software-based optical character recognition (OCR) tool for applying an OCR technique to recognize characters included in a license plate identifier. Cameras 104-1 . . . 104-N send the results of running the first OCR tool to computer system 102.

Computer system 102 runs software-based image recognition tool 108 and a second software-based OCR tool 110. Image recognition tool 108 and second OCR tool 110 receive and process image 106. Second OCR tool 110 improves on the results of the first OCR tool included in one the cameras 104-1 . . . 104-N. By using the results of OCR tool 110, categories of objects that can be included in a valid license plate image, and a fingerprint matrix based on metadata 112, image recognition tool 108 determines image 106 to be a validated or invalidated image 114 without using an MCR process, or determines that MCR 116 is required to further analyze image 106 to determine the identifier in the license plate. MCR 116 determines that image 106 is a validated or invalidated image 118 with the usage of the MCR process.

Computer system 102 also runs a software-based learning tool 120. If MCR 116 determines a valid license plate image by determining a license plate identifier, then MCR 116 identifies metadata resulting from the MCR processing of image 106 and sends the metadata to a learning tool 120, which stores in a database (not shown) the identified metadata and its association to the corresponding license plate identifier. On subsequent processing of another image having the same license plate as was included in a previously processed image, image recognition tool 108 uses metadata 112 to identify the metadata in the subsequent image and determine the license plate identifier corresponding to the identified metadata, without requiring MCR 116.

The functionality of the components of FIG. 1 is described in more detail in the discussion presented below relative to FIGS. 2A-2C and in the section entitled Computer System.

Process for Determining a License Plate Image is Valid or Invalid

Figure 2A:
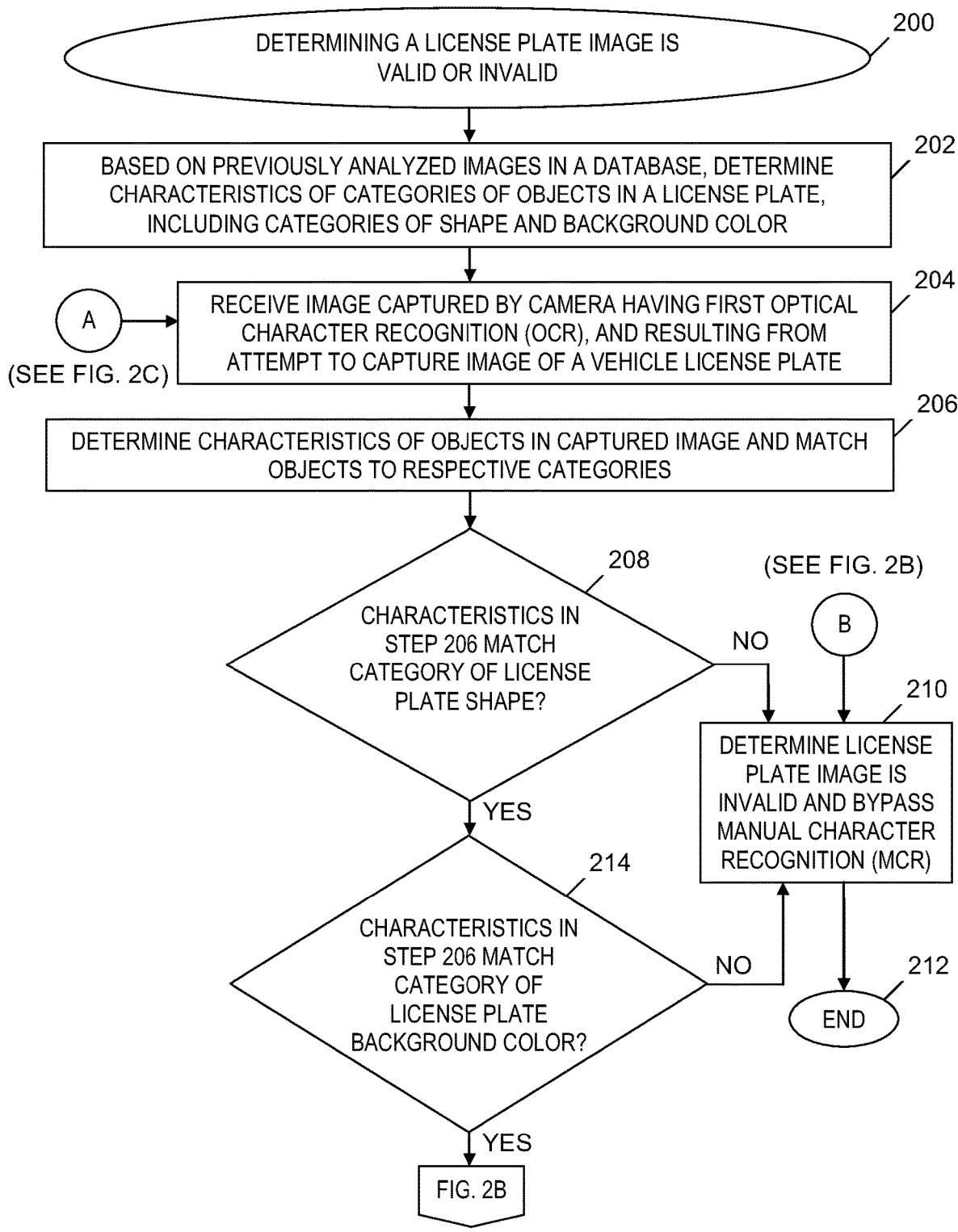
FIGS. 2A-2C depict a flowchart of a process of determining a license plate image is valid or invalid in the system of FIG. 1, in accordance with embodiments of the present invention.
Figure 2B:
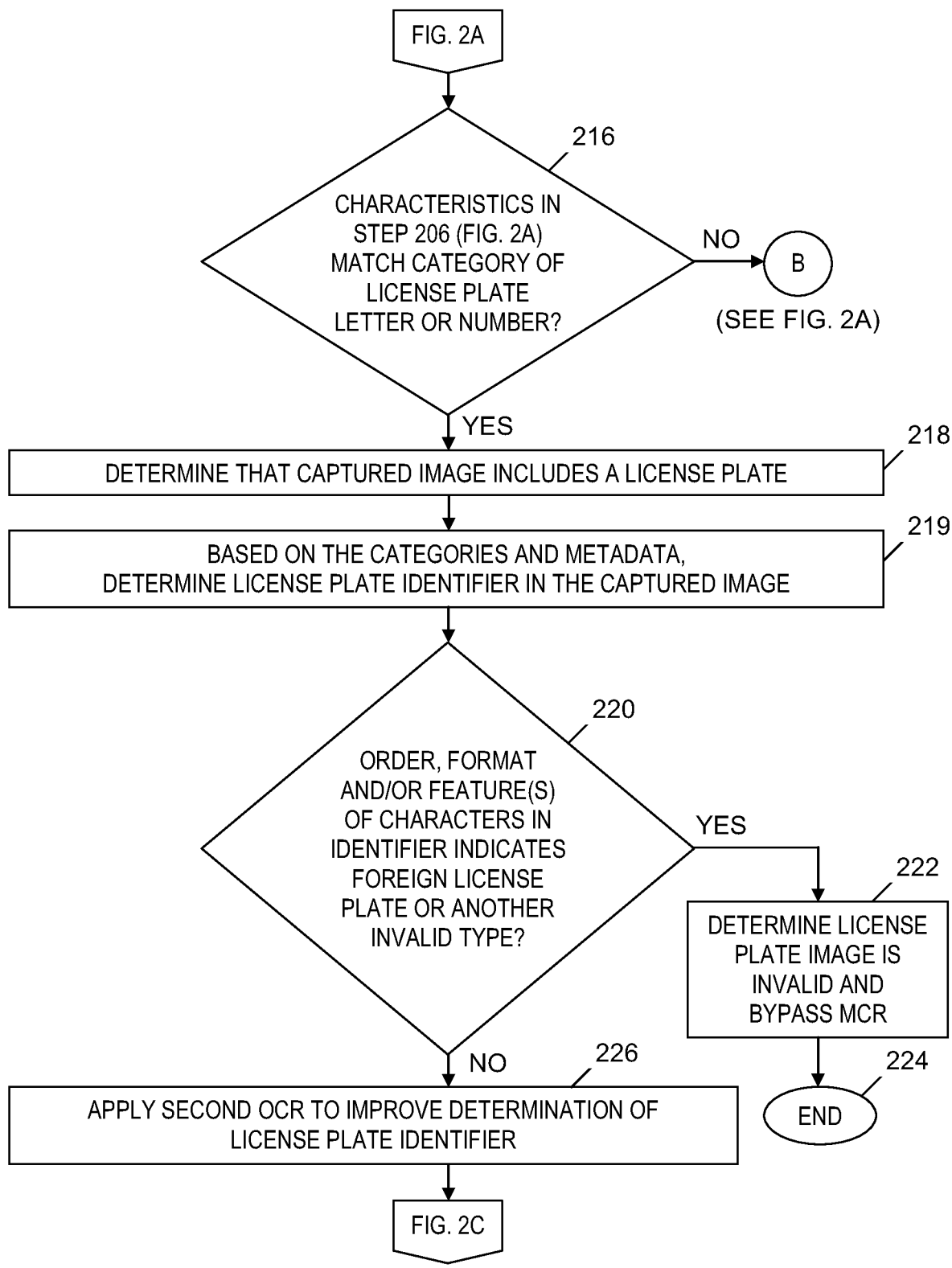
Figure 2C:
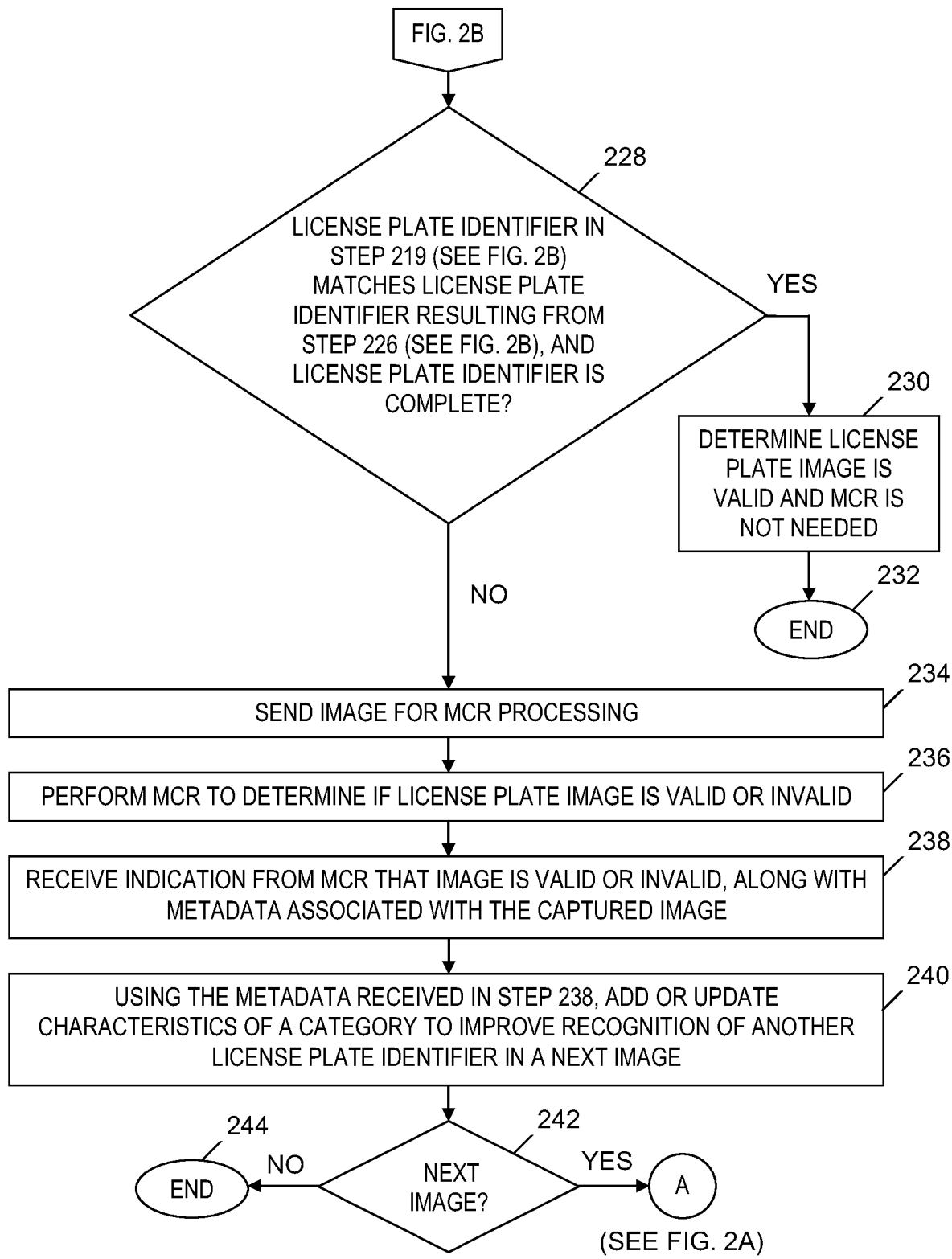

FIGS. 2A-2C depict a flowchart of a process of determining a license plate image is valid or invalid in the system of FIG. 1, in accordance with embodiments of the present invention. The process of FIGS. 2A-2C starts at step 200. In step 202, image recognition tool 108 (see FIG. 1) determines characteristics of one or more categories of objects that can be included in a license plate. A first category includes characteristics of a shape, border or outline of a license plate, while another category indicates an image that lacks the characteristics of the shape, border or outline of a license plate. For example, an Image X having objects with points that make up a rectangular border of a license plate is paired to the aforementioned first category.

In one embodiment, a second category includes characteristics of a particular color (i.e., background color) that is the predominant color of a background of a license plate, and a third category includes characteristics of a letter or number included in an identifier on a license plate. For example, object points in an image that make up a line similar to the letter "S" means that the image is in a Category S that includes characteristics of the letter "S".

In one embodiment, an identifiable license plate category is determined in step 202, where the identifiable license plate category includes a combination of the characteristics of the first, second and third categories, described above. For example, an identifiable license plate category may include characteristics of (1) a rectangular object, (2) a background color of white, and (3) at least one letter or number.

In one embodiment, computer system 102 (see FIG. 1) receives the characteristics of the categories as user input to computer system 102 (see FIG. 1). In another embodiment, image recognition tool 108 (see FIG. 1) determines the characteristics of the categories based on multiple license plate images that had been captured by cameras 104-1 . . . 104-N (see FIG. 1) and analyzed by MCR 116 (see FIG. 1) or by a content-based image analysis tool such as IBM Multimedia Analysis and Retrieval System (IMARS) prior to step 202. IMARS is offered by International Business Machines Corporation located in Armonk, N.Y.

In step 204, image recognition tool 108 (see FIG. 1) receives image 106 (see FIG. 1), which was captured by camera 104-1 (see FIG. 1) prior to step 204. Camera 104-1 (see FIG. 1) captured image 106 (see FIG. 1) in an attempt to capture an image of a license plate of a vehicle. Also in step 204, a first OCR tool running in camera 104-1 (see FIG. 1) performs optical character recognition to attempt to determine an identifier in image 106 (see FIG. 1), in an attempt to recognize the identifier on the license plate.

In one embodiment, camera 104-1 (see FIG. 1) is part of a camera system at a charging point on a toll road, where the camera captures image 106 (see FIG. 1) to capture an image of the license plate of a vehicle passing through the charging point. After capturing the image of the license plate, computer system 102 (see FIG. 1) uses image 106 (see FIG. 1) to determine the identifier on the license plate of the vehicle. Subsequently, computer system 102 (see FIG. 1) or another system uses the identifier on the license plate to identify a person to whom a toll is charged, where the identified person is the person who is associated with the registration of the vehicle. For example, the identified person is the owner of the vehicle.

In step 206, image recognition tool 108 (see FIG. 1) determines characteristics of objects in image 106 (see FIG. 1). Also in step 206 and after determining the characteristics, image recognition tool 108 (see FIG. 1) matches the characteristics of the objects in image 106 (see FIG. 1) to characteristics of respective categories determined in step 202. Image recognition tool 108 (see FIG. 1) assigns a confidence level to each matching performed in step 206.

In step 208, image recognition tool 108 (see FIG. 1) determines whether characteristics determined in step 206 match a first category specifying a shape, outline or border of a license plate. If image recognition tool 108 (see FIG. 1) determines in step 208 that characteristics determined in step 206 do not match the aforementioned first category, then the No branch of step 208 is taken and step 210 is performed.

In one embodiment, step 208 determines a lack of a match if (1) image 106 (see FIG. 1) has no license plate at all, (2) a substantial portion of the border of a license plate in image 106 (see FIG. 1) is obscured by glare or a deficiency of light on the license plate, or (3) a substantial portion of the border of license plate in image 106 (see FIG. 1) is not recognizable because of external effects such as heavy rain, snow or mud on the license plate, on the camera or in between the camera and the license plate.

In step 210, image recognition tool 108 (see FIG. 1) determines that image 106 (see FIG. 1) is an invalid license plate image and further determines that MCR 116 (see FIG. 1) is bypassed (i.e., no manual character recognition or other human effort is necessary to determine that the image is an invalid license plate image). Following step 210, the process of FIGS. 2A-2C ends at step 212.

As used herein, determining that characteristics of objects in a captured image match characteristics of a category means determining the characteristics of the objects in the captured image are the same as the characteristics of the category at level of confidence (i.e., confidence level) that exceeds a specified threshold confidence level. As used herein, determining that characteristics of objects in a captured image do not match characteristics of a category means the aforementioned confidence level does not exceed the specified threshold confidence level.

Returning to step 208, if image recognition tool 108 (see FIG. 1) determines that the characteristics determined in step 206 match the first category specifying a shape, outline or border of a license plate, then the Yes branch of step 208 is taken and step 214 is performed.

In step 214, image recognition tool 108 (see FIG. 1) determines whether characteristics determined in step 206 match characteristics of a second category specifying a background color of a license plate. If image recognition tool 108 (see FIG. 1) determines in step 214 that characteristics determined in step 206 do not match characteristics of the aforementioned second category, then the No branch of step 214 is taken and step 210 is performed, as described above. Again, following step 210, the process of FIGS. 2A-2C ends at step 212.

Returning to step 214, if image recognition tool 108 (see FIG. 1) determines that characteristics determined in step 206 match characteristics of the second category specifying the background color of the license plate, then the Yes branch of step 214 is taken and the process of FIGS. 2A-2C continues with step 216 in FIG. 2B.

In step 216, image recognition tool 108 (see FIG. 1) determines whether characteristics determined in step 206 match characteristics of a third category specifying an alphanumeric character of a license plate. If image recognition tool 108 (see FIG. 1) determines in step 216 that the characteristics determined in step 206 do not match the characteristics of the third category, then the No branch of step 216 is taken and step 210 (see FIG. 2A) is performed, as described above. Again, following step 210, the process of FIGS. 2A-2C ends at step 212 (see FIG. 2A).

If image recognition tool 108 (see FIG. 1) determines in step 216 that the characteristics determined in step 206 match the characteristics of the third category specifying an alphanumeric character of a license plate, then the Yes branch of step 216 is taken and step 218 is performed.

In one embodiment, image recognition tool 108 (see FIG. 1) in steps 206-216 builds a "fingerprint matrix" by searching for and storing points in the image where the shape specified by the category specifying the shape, border or outline of a license plate (e.g., rectangular border) meets another object or area, which indicates the presence of letters and numbers specified by other categories. Image recognition tool 108 (see FIG. 1) uses these points in step 219 (see below) in a comparison against previously processed images to determine whether the current image was found previously and processed as a valid license plate image. If the image was found previously and processed as a valid license plate image, then image recognition tool 108 (see FIG. 1) designates the image as valid and bypasses MCR 116 (see FIG. 1). In one embodiment, image recognition tool 108 (see FIG. 1) stores irregularities and patterns on license plates (e.g., patterns of bumps on the license plate) and the type of license plate holder. When comparing a current image to previously processed images, the irregularities, patterns and type of license plate holder information is also used as bases for determining whether a current image was found and processed previously.

In step 218, image recognition tool 108 (see FIG. 1) determines that image 106 (see FIG. 1) includes a license plate.

Prior to step 219, image recognition tool 108 (see FIG. 1) identifies metadata about image 106 (see FIG. 1) and stores the metadata and its association to image 106 (see FIG. 1) in a database (not shown in FIG. 1). In one embodiment, the metadata identified and stored prior to step 219 includes a combination of the following data items: (1) an identification of a charging point at which a camera captured image 106 (see FIG. 1); (2) an identification of a particular lane at the charging point at which the camera is stationed; (3) an identification of whether the camera is aimed towards the front or the back of vehicles passing through the charging point; (4) a time at which image 106 (see FIG. 1) was captured by the camera; (5) a date or season at which image 106 (see FIG. 1) was captured by the camera; (6) one or more classifications of the result of MCR 116 (see FIG. 1) (e.g., successful determination of the license plate identifier or a missing license plate identifier); (7) a confidence level of the result of MCR 116 (see FIG. 1); and (8) a confidence level of a result of optical character recognition by the first OCR tool in the camera and/or second OCR tool 110 (see FIG. 1).

The aforementioned confidence level of characteristics of objects in an image matching characteristics of a category may be increased if the matching is further based on similarities between metadata such as some combination of metadata (1) through (5), described above. In one embodiment, the similarity in the metadata means that there is a similarity in the amount and angle of light shining on the license plates in image 106 (see FIG. 1) and in the images on which the characteristics of the category are based. For example, matching characteristics of objects in Image X to characteristics of Category C may have Confidence Level 60, without regard to certain metadata. By taking into account that the objects in Image X were captured in the morning, during the summer, at Charging Point CP1 in lane 1, and comparing those objects to characteristics of sub-categories that specify the morning, the summer, Charging Point CP1 and lane 1, the resulting Confidence Level is increased from 60 to 90.

In step 219, based on matching characteristics of objects in image 106 (see FIG. 1) to characteristics of categories of alphanumeric characters determined in step 202 (see FIG. 2A), image recognition tool 108 (see FIG. 1) determines the identifier on the license plate in image 106 (see FIG. 1). In one embodiment, the determination of the identifier in step 219 is further based on matching metadata derived from image 106 (see FIG. 1) to previously identified and stored metadata 112 (see FIG. 1).

In step 220, image recognition tool 108 (see FIG. 1) determines whether the order, format or design feature(s) of characters in the identifier determined in step 219 indicates a foreign license plate or a license plate of another type that is required to be designated as invalid. In one embodiment, the design feature(s) include the typeface and/or font of the characters. If image recognition tool 108 (see FIG. 1) determines in step 220 that the order, format or design features of characters in the identifier indicates a foreign license plate or another invalid type of license plate, then the Yes branch of step is taken and step 222 is performed. In step 222, image recognition tool 108 (see FIG. 1) determines image 106 (see FIG. 1) is an invalid license plate image and bypasses MCR 116 (see FIG. 1). Following step 222, the process of FIGS. 2A-2C ends at step 224.

For example, cameras at a charging point are used by system 100 (see FIG. 1) to identify those vehicles who have license plates issued by Country X, which issues license plate identifiers in the format <letter> <letter> <letter> <digit> <digit> <digit> (e.g. "ABC 123"), for purposes of charging a toll only to vehicles' owners who are citizens of Country X. Furthermore, in this example, system 100 (see FIG. 1) identifies other vehicles passing through the charging point that have foreign license plates (i.e., those license plates having a format other than <letter> <letter> <letter> <digit> <digit> <digit>, which means the license plates were issued by one or more countries other than Country X). By identifying the foreign license plates, the system invalidates the images having foreign license plates without requiring MCR 116 (see FIG. 1). The foreign license plate images need to be invalidated because under the laws of Country X, owners of the vehicles having foreign license plates should not be charged the toll.

Returning to step 220, if image recognition tool 108 (see FIG. 1) determines in step 220 that the order, format or design feature(s) of characters in the identifier do not indicate a foreign license plate or another invalid type of license plate, then the No branch of step is taken and step 226 is performed.

In step 226, OCR tool 110 (see FIG. 1) performs a second optical character recognition to determine the license plate identifier in an attempt to improve the determination of the identifier made in step 204 (see FIG. 2A) by the first OCR tool included in camera 104-1 (see FIG. 1). Following step 226, the process of FIGS. 2A-2C continues with step 228 in FIG. 2C.

In step 228, image recognition tool 108 (see FIG. 1) determines whether the license plate identifier determined in step 219 (see FIG. 2B) matches the license plate identifier determined in step 226 and whether the license plate identifier is a complete identifier. If image recognition tool 108 (see FIG. 1) determines in step 228 the aforementioned match and the license plate identifier being complete, then the Yes branch of step 228 is taken and step 230 is performed.

In step 230, image recognition tool 108 (see FIG. 1) determines image 106 (see FIG. 1) is a valid license plate image and bypasses MCR 116 (see FIG. 1) (i.e., manual character recognition is not needed to determine the validity of the license plate image). Following step 230, the process of FIGS. 2A-2C ends at step 232.

Returning to step 228, if image recognition tool 108 (see FIG. 1) determines the license plate identifier determined in step 219 (see FIG. 2B) does not match the license plate identifier determined in step 226 of the license plate identifier is not a complete identifier, then the No branch of step 228 is taken and step 234 is performed.

In step 234, image recognition tool 108 (see FIG. 1) sends image 106 (see FIG. 1) so that a person receives image 106 (see FIG. 1). In step 236, the person who received image 106 (see FIG. 1) performs MCR 116 (see FIG. 1) to determine if image 106 is a valid or invalid license plate image.

In step 238, image recognition tool 108 (see FIG. 1) receives an indication from the person who performed MCR 116 (see FIG. 1) in step 236 that image 106 (see FIG. 1) is valid or invalid. Also in step 238, learning tool 120 (see FIG. 1) receives metadata about image 106 (see FIG. 1) resulting from MCR 116 (see FIG. 1), stores in a database the received metadata and its association to image 106 (see FIG. 1), and further stores in the database the received metadata and its association to a license plate identifier if MCR 116 (see FIG. 1) determined the license plate identifier.

In step 240, using the metadata received in step 238, learning tool 120 (see FIG. 1) adds or modifies characteristics of a category to improve recognition of another license plate identifier in a next image captured by camera 104-1 (see FIG. 1) or by another camera.

In step 242, image recognition tool 108 (see FIG. 1) determines whether there is a next image that has not yet been processed by the process of FIGS. 2A-2C. If image recognition tool 108 (see FIG. 1) determines in step 242 that there is a next image, then the Yes branch of step 242 is taken and the process repeats starting at step 204 (see FIG. 2A) with the next image being processed as image 106 (see FIG. 1). If image recognition tool 108 (see FIG. 1) determines in step 242 that there is no next image to be processed, then the No branch of step 242 is taken and the process of FIGS. 2A-2C ends at step 244.

In an alternate embodiment, an identifiable license plate category is determined in step 202 (see FIG. 2A) to include only the characteristics of a shape, border or outline of a license plate. In this case, step 214 (see FIG. 2A) and step 216 (see FIG. 2B) are not required to occur before step 218 (see FIG. 2B). In another alternate embodiment, an identifiable license plate category is determined in step 202 (see FIG. 2A) to include the characteristics of the shape, border or outline of a license plate and further includes only one of the following: (1) characteristics of a background color with step 216 (see FIG. 2B) not required to occur before step 218 (see FIG. 2B) or (2) characteristics of a letter or number included in an identifier on a license plate with step 214 (see FIG. 2A) not required to occur before step 218 (see FIG. 2B).

Examples

Figure 3:
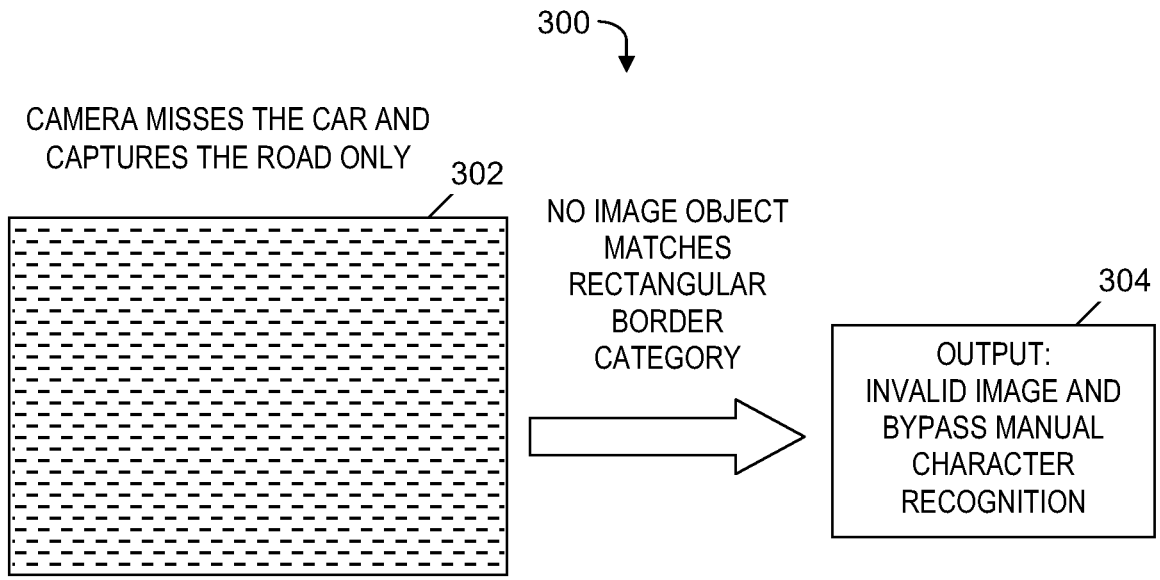
FIG. 3 depicts a first exemplary image determined to be invalid by the process of FIGS. 2A-2C, in accordance with embodiments of the present invention.

FIG. 3 depicts a first exemplary image determined to be invalid by the process of FIGS. 2A-2C, in accordance with embodiments of the present invention. Example 300 includes an exemplary image 302 that includes only an image of a road surface because camera 104-1 (see FIG. 1) missed capturing an image of a car that passed through a charging point. In step 202 (see FIG. 2A) image recognition tool 108 (see FIG. 1) determines the characteristics of a rectangular border that indicate a likelihood that a license plate is included in image 302. Image recognition tool 108 (see FIG. 1) receives image 302 in step 204 (see FIG. 2A). Image recognition tool 108 (see FIG. 1) determines in step 208 (see FIG. 2A) that no characteristics of image 302 match the characteristics of the rectangular border. Based on the determination in step 208 (see FIG. 2A), image recognition tool 108 (see FIG. 1) bypasses MCR 116 (see FIG. 1) and generates output 304 that indicates image 302 is an invalid license plate image.

Figure 4:
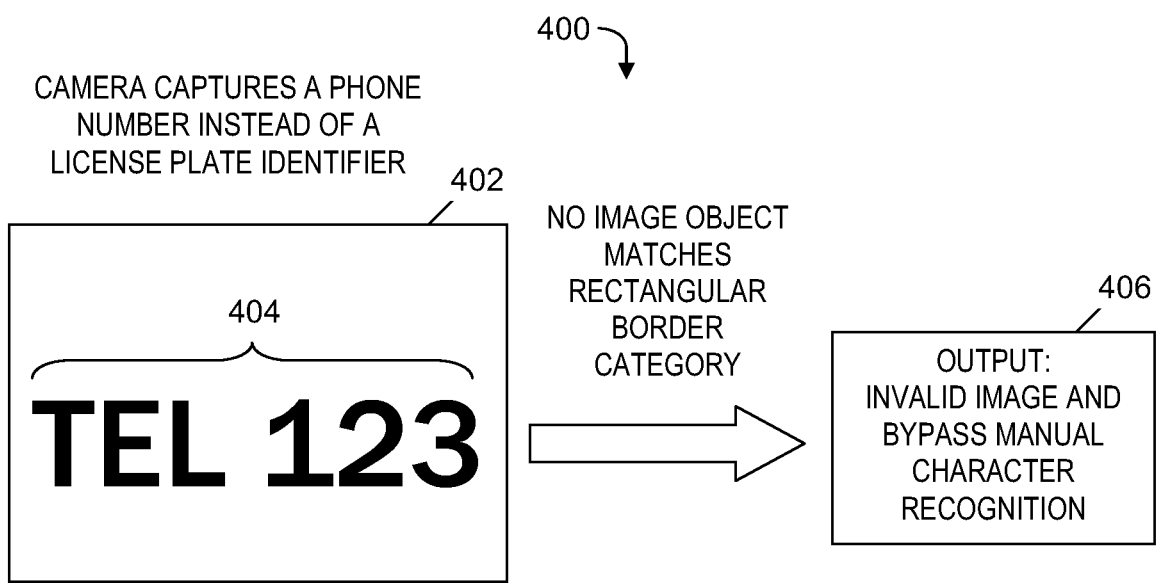
FIG. 4 depicts a second exemplary image determined to be invalid by the process of FIGS. 2A-2C, in accordance with embodiments of the present invention.

FIG. 4 depicts a second exemplary image determined to be invalid by the process of FIGS. 2A-2C, in accordance with embodiments of the present invention. Example 400 includes an exemplary image 402 that includes a set of alphanumeric characters 404, which includes letters indicating a telephone number and numbers of the telephone number. The letters and numbers in characters 404 are in a format that resembles the format of letters and numbers in a license plate identifier. In step 202 (see FIG. 2A) image recognition tool 108 (see FIG. 1) determines the characteristics of a rectangular border that indicate a likelihood that a license plate is included in image 402. Image recognition tool 108 (see FIG. 1) receives image 402 in step 204 (see FIG. 2A). Image recognition tool 108 (see FIG. 1) determines in step 208 (see FIG. 2A) that no characteristics of image 402 match the characteristics of the rectangular border. Based on the determination in step 208 (see FIG. 2A), image recognition tool 108 (see FIG. 1) bypasses MCR 116 (see FIG. 1) and generates output 406 that indicates image 402 is an invalid license plate image.

Figure 5:
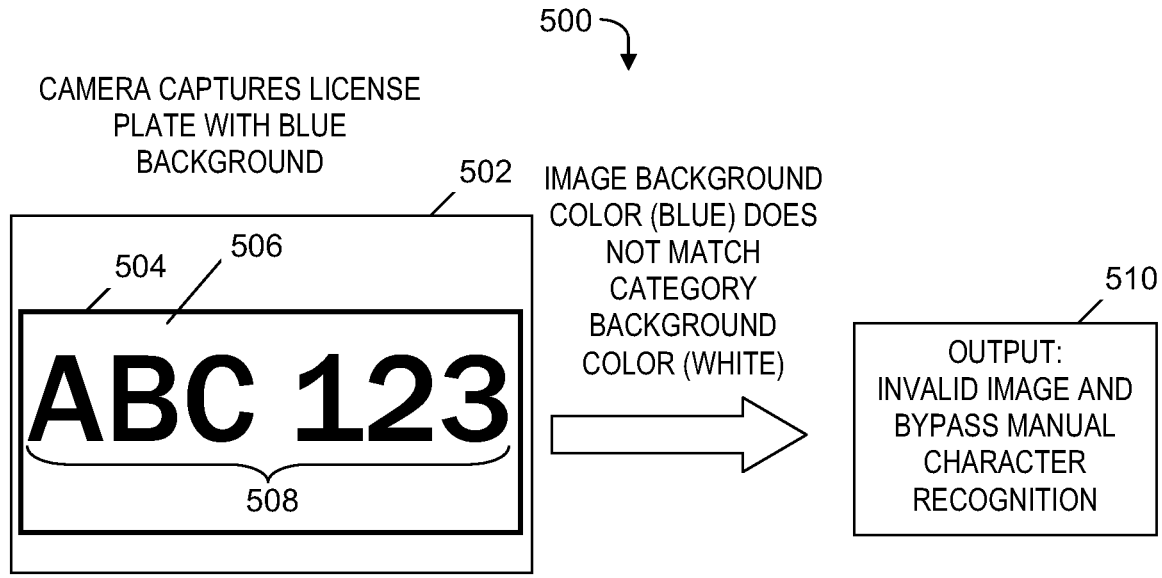
FIG. 5 depicts a third exemplary image determined to be invalid by the process of FIGS. 2A-2C, in accordance with embodiments of the present invention.

FIG. 5 depicts a third exemplary image determined to be invalid by the process of FIGS. 2A-2C, in accordance with embodiments of the present invention. Example 500 includes an exemplary image 502 that includes a rectangular border 504, a background 506 having a color of blue (i.e., the background color), and a set of alphanumeric characters 508, which includes letters and numbers in a format that resembles the format of a license plate identifier. In step 202 (see FIG. 2A) image recognition tool 108 (see FIG. 1) determines that the characteristics of a rectangular border and a background color of white indicate a likelihood that a license plate is included in image 502. Image recognition tool 108 (see FIG. 1) receives image 502 in step 204 (see FIG. 2A). Image recognition tool 108 (see FIG. 1) determines in step 208 (see FIG. 2A) that characteristics of rectangular border 504 match the characteristics of the rectangular border determined in step 202 (see FIG. 2A). Image recognition tool 108 (see FIG. 1) determines in step 214 (see FIG. 2A) that background 506 having a color of blue does not match the background color of white determined as a characteristic in step 202. Based on the determination in step 214 (see FIG. 2A), image recognition tool 108 (see FIG. 1) bypasses MCR 116 (see FIG. 1) and generates output 510 that indicates image 502 is an invalid license plate image.

Figure 6:
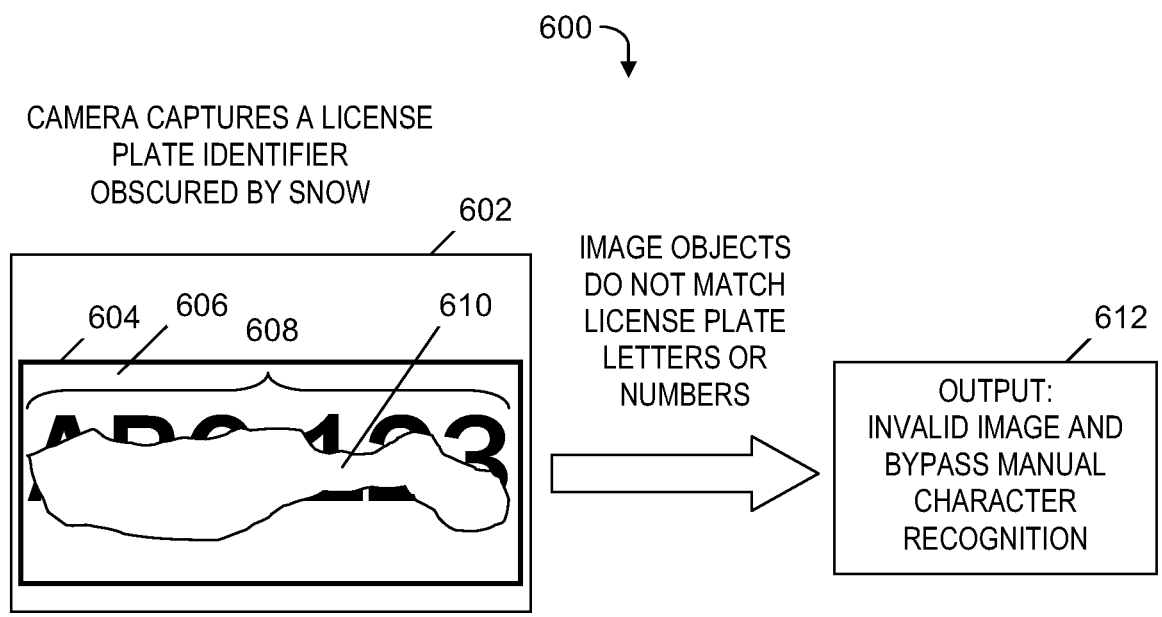
FIG. 6 depicts a fourth exemplary image determined to be invalid by the process of FIGS. 2A-2C, in accordance with embodiments of the present invention.

FIG. 6 depicts a fourth exemplary image determined to be invalid by the process of FIGS. 2A-2C, in accordance with embodiments of the present invention. Example 600 includes an exemplary image 602 that includes a rectangular border 604, a background 606 having a color of white (i.e., the background color), and a set of alphanumeric characters 608 which are partially obscured by snow 610. In step 202 (see FIG. 2A) image recognition tool 108 (see FIG. 1) determines that the characteristics of a rectangular border and a background color of white indicate a likelihood that a license plate is included in image 602. Also in step 202, image recognition tool 108 (see FIG. 1) determines the characteristics of letters and numbers that may appear on a license plate. Image recognition tool 108 (see FIG. 1) receives image 602 in step 204 (see FIG. 2A). Image recognition tool 108 (see FIG. 1) determines in step 208 (see FIG. 2A) that characteristics of rectangular border 604 match the characteristics of the rectangular border determined in step 202 (see FIG. 2A). Image recognition tool 108 (see FIG. 1) determines in step 214 (see FIG. 2A) that the white color of background 606 matches the background color of white determined as a characteristic in step 202 (see FIG. 2A). Image recognition tool 108 (see FIG. 1) determines in step 216 (see FIG. 2B) that characteristics of any of alphanumeric characters 608 do not match characteristics of any license plate number or letter determined in step 202 (see FIG. 2A) because alphanumeric characters 608 are obscured by snow 610. Based on the determination in step 216 (see FIG. 2B), image recognition tool 108 (see FIG. 1) bypasses MCR 116 (see FIG. 1) and generates output 612 that indicates image 602 is an invalid license plate image.

Computer System

Figure 7:
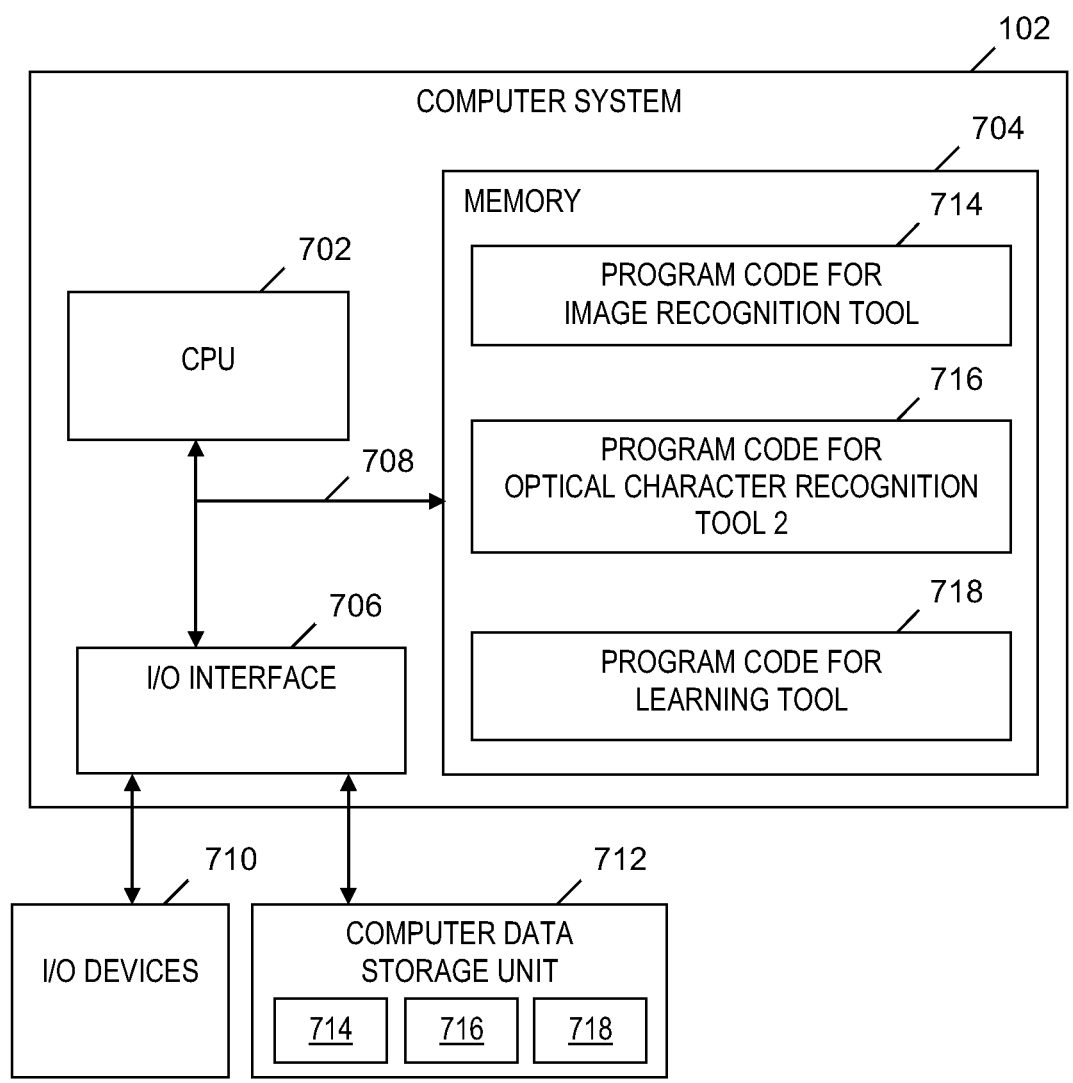
FIG. 7 is a block diagram of a computer system included in the system of FIG. 1 and that implements the process of FIGS. 2A-2C, in accordance with embodiments of the present invention.

FIG. 7 is a block diagram of a computer system included in the system of FIG. 1 and that implements the process of FIGS. 2A-2C, in accordance with embodiments of the present invention. Computer system 102 generally includes a central processing unit (CPU) 702, a memory 704, an input/output (I/O) interface 706, and a bus 708. Further, computer system 102 is coupled to I/O devices 710 and a computer data storage unit 712. CPU 702 performs computation and control functions of computer system 102, including executing instructions included in program code 714, 716 and 718 to perform a method of determining a license plate image is valid or invalid, where the instructions are executed by CPU 702 via memory 704. CPU 702 may include a single processing unit, or be distributed across one or more processing units in one or more locations (e.g., on a client and server). Program code 714 includes program code for image recognition tool 108 (see FIG. 1). Program code 716 includes program code for OCR tool 110 (see FIG. 1). Program code 718 includes program code for learning tool 120 (see FIG. 1). In an alternate embodiment, program code 716 and/or program code 718 does not reside in computer system 102 and instead runs in one or more other computer systems external to computer system 102.

Memory 704 includes a known computer-readable storage medium, which is described below. In one embodiment, cache memory elements of memory 704 provide temporary storage of at least some program code (e.g., program code 714, 716 and 718) in order to reduce the number of times code must be retrieved from bulk storage while instructions of the program code are executed. Moreover, similar to CPU 702, memory 704 may reside at a single physical location, including one or more types of data storage, or be distributed across a plurality of physical systems in various forms. Further, memory 704 can include data distributed across, for example, a local area network (LAN) or a wide area network (WAN).

I/O interface 706 includes any system for exchanging information to or from an external source. I/O devices 710 include any known type of external device, including a display device (e.g., monitor), keyboard, mouse, printer, speakers, handheld device, facsimile, etc. I/O devices 710 include cameras 104-1 . . . 104-N (see FIG. 1). Bus 708 provides a communication link between each of the components in computer system 102, and may include any type of transmission link, including electrical, optical, wireless, etc.

I/O interface 706 also allows computer system 102 to store information (e.g., data or program instructions such as program code 714, 716 and 718) on and retrieve the information from computer data storage unit 712 or another computer data storage unit (not shown). In one embodiment, program code 714, 716 and 718 are stored on computer data storage unit 712. Computer data storage unit 712 includes a known computer-readable storage medium, which is described below. In one embodiment, computer data storage unit 712 is be a non-volatile data storage device, such as a magnetic disk drive (i.e., hard disk drive) or an optical disc drive (e.g., a CD-ROM drive which receives a CD-ROM disk).

Memory 704 and/or storage unit 712 may store computer program code 714, 716 and 718 that includes instructions that are executed by CPU 702 via memory 704 to determine a license plate image is valid or invalid. Although FIG. 7 depicts memory 704 as including program code 714, 716 and 718, the present invention contemplates embodiments in which memory 704 does not include all of code 714, 716 and 718 simultaneously, but instead at one time includes only a portion of code 714, a portion of code 716 and/or a portion of code 718.

Further, memory 704 may include other systems not shown in FIG. 7, such as an operating system (e.g., Linux®) that runs on CPU 702 and provides control of various components within and/or connected to computer system 102. Linux is a registered trademark of Linus Torvalds in the United States, other countries, or both.

Storage unit 712 and/or one or more other computer data storage units (not shown) that are coupled to computer system 102 may store metadata 122 (see FIG. 1) and image 106 (see FIG. 1).

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable medium(s) (e.g., memory 704 and/or computer data storage unit 712) having computer-readable program code (e.g., program code 714, 716 and 718) embodied or stored thereon.

Any combination of one or more computer-readable mediums (e.g., memory 704 and computer data storage unit 712) may be utilized. In one embodiment, the computer-readable medium is a computer-readable storage medium, and in another embodiment, the computer-readable medium is a computer-readable signal medium. As used herein, a computer-readable storage medium is not a computer-readable signal medium.

In one embodiment, the computer-readable storage medium is a physical, tangible computer-readable storage device or physical, tangible computer-readable storage apparatus that stores but does not propagate, and is not a transitory form of signal transmission. A computer-readable storage medium may include, for example, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is a physical, tangible storage medium that can contain or store a program (e.g., program 714, 716 and 718) for use by or in connection with a system, apparatus, or device for carrying out instructions in the program, and which does not propagate.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 714, 716 and 718) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 714, 716 and 718) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 7. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2C) and/or block diagrams of methods, apparatus (systems) (e.g., FIG. 1 and FIG. 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 714, 716 and 718). These computer program instructions may be provided to one or more hardware processors (e.g., CPU 702) of a general purpose computer, special purpose computer, or other programmable data processing apparatus to produce a machine, such that the instructions, which are executed via the processor(s) of the computer or other programmable data processing apparatus, create means for implementing the functions/acts specified in the flowcharts and/or block diagram block or blocks.

These computer program instructions may also be stored in a computer-readable medium (e.g., memory 704 or computer data storage unit 712) that can direct a computer (e.g., computer system 102), other programmable data processing apparatus, or other devices to function in a particular manner, such that the instructions (e.g., program 714, 716 and 718) stored in the computer-readable medium produce an article of manufacture including instructions which implement the function/act specified in the flowcharts and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer-implemented process such that the instructions (e.g., program 714, 716 and 718) which are executed on the computer, other programmable apparatus, or other devices provide processes for implementing the functions/acts specified in the flowcharts and/or block diagram block or blocks.

Any of the components of an embodiment of the present invention can be deployed, managed, serviced, etc. by a service provider that offers to deploy or integrate computing infrastructure with respect to determining a license plate image is valid or invalid. Thus, an embodiment of the present invention discloses a process for supporting computer infrastructure, where the process includes providing at least one support service for at least one of integrating, hosting, maintaining and deploying computer-readable code (e.g., program code 714, 716 and 718) in a computer system (e.g., computer system 102) including one or more processors (e.g., CPU 702), wherein the processor(s) carry out instructions contained in the code causing the computer system to determine a license plate image is valid or invalid. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of determining a license plate image is valid or invalid.

While it is understood that program code 714, 716 and 718 for determining a license plate image is valid or invalid may be deployed by manually loading directly in client, server and proxy computers via loading a computer-readable storage medium (e.g., computer data storage unit 712), program code 714, 716 and 718 may also be automatically or semi-automatically deployed into computer system 102 by sending program code 714, 716 and 718 to a central server (e.g., computer system 102) or a group of central servers. Program code 714, 716 and 718 is then downloaded into computer system 102, which will execute program code 714, 716 and 718. Alternatively, program code 714, 716 and 718 is sent directly to the computer system 102 via e-mail. Program code 714, 716 and 718 is then either detached to a directory on computer system 102 or loaded into a directory on computer system 102 by a button on the e-mail that executes a program that detaches program code 714, 716 and 718 into a directory. Another alternative is to send program code 714, 716 and 718 directly to a directory on a hard drive of computer system 102. In a case in which there are proxy servers, the process selects the proxy server code, determines on which computers to place the proxy servers' code, transmits the proxy server code, and then installs the proxy server code on the proxy computer. Program code 714, 716 and 718 is transmitted to the proxy server (i.e., computer system 102) and then it is stored on the proxy server.

In one embodiment, program code 714, 716 and 718 is integrated into a client, server and network environment by providing for program code 714, 716 and 718 to coexist with software applications (not shown), operating systems (not shown) and network operating systems software (not shown) and then installing program code 714, 716 and 718 on the clients and servers (e.g., computer system 102) in the environment where program code 714, 716 and 718 will function.

The first step of the aforementioned integration of code included in program code 714, 716 and 718 is to identify any software on the clients and servers including the network operating system (not shown) where program code 714, 716 and 718 will be deployed that are required by program code 714, 716 and 718 or that work in conjunction with program code 714, 716 and 718. This identified software includes the network operating system that is software that enhances a basic operating system by adding networking features. Next, the software applications and version numbers are identified and compared to the list of software applications and version numbers that have been tested to work with program code 714, 716 and 718. Those software applications that are missing or that do not match the correct version are upgraded with the correct version numbers. Program instructions that pass parameters from program code 714, 716 and 718 to the software applications are checked to ensure the parameter lists match the parameter lists required by the program code 714, 716 and 718. Conversely, parameters passed by the software applications to program code 714, 716 and 718 are checked to ensure the parameters match the parameters required by program code 714, 716 and 718. The client and server operating systems including the network operating systems are identified and compared to the list of operating systems, version numbers and network software that have been tested to work with program code 714, 716 and 718. Those operating systems, version numbers and network software that do not match the list of tested operating systems and version numbers are upgraded on the clients and servers to the required level. After ensuring that the software, where program code 714, 716 and 718 is to be deployed, is at the correct version level that has been tested to work with program code 714, 716 and 718, the integration is completed by installing program code 714, 716 and 718 on the clients and servers.

Another embodiment of the invention provides a method that performs the process steps on a subscription, advertising and/or fee basis. That is, a service provider, such as a Solution Integrator, can offer to create, maintain, support, etc. a process of determining a license plate image is valid or invalid. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The flowcharts in FIGS. 2A-2C and the block diagrams in FIG. 1 and FIG. 7 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 714, 716 or 718), which includes one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of processing an image, the method comprising the steps of:
   a computer determining a category specifying characteristics of a shape of a license plate of a vehicle;
   based on the category specifying the characteristics of the shape of the license plate, the computer determining characteristics of objects in the image match the characteristics of the shape of the license plate;
   the computer determining the image includes the license plate and an identifier included in the license plate;
   the computer determining a category specifying characteristics of an order of alphanumeric characters in the identifier, the order required to be a characteristic of identifiable license plates;
   based on the category specifying the characteristics of the order of the alphanumeric characters in the identifier, the computer determining characteristics of the objects in the image do not match the characteristics of the order of the alphanumeric characters in the identifier;
   based on the characteristics of the objects in the image not matching the characteristics of the order of the alphanumeric characters in the identifier, the computer determining the image does not include an identifiable license plate; and
   in response to the step of determining the image does not include the identifiable license plate, the computer determining the image is invalid and bypassing a manual character recognition process for determining identifiers on license plates.

2. The method of claim 1, further comprising the steps of:
   the computer determining the category further specifying characteristics of a shape of a second license plate of a second vehicle;
   based on the category specifying the characteristics of the shape of the second license plate, the computer determining characteristics of objects in a second image match the characteristics of the shape of the second license plate;
   based on the characteristics of the objects in second image matching the characteristics of the shape of the second license plate, the computer determining the second image includes a second identifiable license plate;
   in response to the step of determining the second image includes the second identifiable license plate, the computer determining the shape of the second license plate includes a plurality of alphanumeric characters;
   the computer determining one or more alphanumeric characters included in the plurality of alphanumeric characters are not identifiable; and
   in response to the step of determining the one or more alphanumeric characters are not identifiable, the computer sending the second image to a manual character recognition process for identifying the one or more alphanumeric characters.

3. The method of claim 2, further comprising the steps of:
   subsequent to the step of sending the second image to the manual character recognition process for identifying the one or more alphanumeric characters, the computer receiving an indication that the second image is valid, receiving an identifier included in the second license plate, and receiving a first confidence value of the identifier resulting from the manual character recognition process for identifying the one or more alphanumeric characters;
   the computer receiving metadata specifying a characteristic of the second image, the characteristic of the second image selected from the group consisting of a charging point at which a camera captured the second image, a traffic lane in which the second vehicle was traveling as the camera captured the second image, an identification of the camera that captured the second image, a time at which the camera captured the second image, a date on which the camera captured the second image, and the received first confidence value;
   the computer updating another category with the characteristic of the second image specified by the received metadata;
   the computer receiving a third image including the second license plate;

the computer determining the third image has a characteristic that matches the characteristic of the second image specified by the received metadata; and based on the third image having the characteristic that matches the characteristic of the second image specified by the received metadata, the computer determining the identifier of the second license plate in the third image has a second confidence value which is greater than the first confidence value.

4. The method of claim 1, further comprising the step of:
providing at least one support service for at least one of creating, integrating, hosting, maintaining, and deploying computer-readable program code in the computer, the program code being executed by a processor of the computer to implement the steps of determining the category specifying the characteristics of the shape, determining the characteristics of the objects in the image match the characteristics of the shape of the license plate, determining the image includes the license plate and the identifier, determining the category specifying the characteristics of the order of the alphanumeric characters in the identifier, determining the characteristics of the objects in the image do not match the characteristics of the order of the alphanumeric characters in the identifier, determining the image does not include the identifiable license plate, determining the image is invalid, and bypassing the manual character recognition process for determining the identifiers on license plates.

5. A computer system comprising:
a central processing unit (CPU);
a memory coupled to the CPU;
a computer-readable, tangible storage device coupled to the CPU, the storage device containing instructions that are executed by the CPU via the memory to implement a method of processing an image, the method comprising the steps of:
the computer system determining a category specifying characteristics of a shape of a license plate of a vehicle;
based on the category specifying the characteristics of the shape of the license plate, the computer system determining characteristics of objects in the image match the characteristics of the shape of the license plate;
the computer system determining the image includes the license plate and an identifier included in the license plate;
the computer system determining a category specifying characteristics of an order of alphanumeric characters in the identifier, the order required to be a characteristic of identifiable license plates;
based on the category specifying the characteristics of the order of the alphanumeric characters in the identifier, the computer system determining characteristics of the objects in the image do not match the characteristics of the order of the alphanumeric characters in the identifier;
based on the characteristics of the objects in the image not matching the characteristics of the order of the alphanumeric characters in the identifier, the computer system determining the image does not include an identifiable license plate; and
in response to the step of determining the image does not include the identifiable license plate, the computer system determining the image is invalid and bypassing a manual character recognition process for determining identifiers on license plates.

6. The computer system of claim 5, wherein the method further comprises the steps of:
the computer system determining the category further specifying characteristics of a shape of a second license plate of a second vehicle;
based on the category specifying the characteristics of the shape of the second license plate, the computer system determining characteristics of objects in a second image match the characteristics of the shape of the second license plate;
based on the characteristics of the objects in second image matching the characteristics of the shape of the second license plate, the computer system determining the second image includes a second identifiable license plate;
in response to the step of determining the second image includes the second identifiable license plate, the computer system determining the shape of the second license plate includes a plurality of alphanumeric characters;
the computer system determining one or more alphanumeric characters included in the plurality of alphanumeric characters are not identifiable; and
in response to the step of determining the one or more alphanumeric characters are not identifiable, the computer system sending the second image to a manual character recognition process for identifying the one or more alphanumeric characters.

7. The computer system of claim 6, wherein the method further comprises the steps of:
subsequent to the step of sending the second image to the manual character recognition process for identifying the one or more alphanumeric characters, the computer system receiving an indication that the second image is valid, receiving an identifier included in the second license plate, and receiving a first confidence value of the identifier resulting from the manual character recognition process for identifying the one or more alphanumeric characters;
the computer system receiving metadata specifying a characteristic of the second image, the characteristic of the second image selected from the group consisting of a charging point at which a camera captured the second image, a traffic lane in which the second vehicle was traveling as the camera captured the second image, an identification of the camera that captured the second image, a time at which the camera captured the second image, a date on which the camera captured the second image, and the received first confidence value;
the computer system updating another category with the characteristic of the second image specified by the received metadata;
the computer system receiving a third image including the second license plate;
the computer system determining the third image has a characteristic that matches the characteristic of the second image specified by the received metadata; and
based on the third image having the characteristic that matches the characteristic of the second image specified by the received metadata, the computer system determining the identifier of the second license plate in the third image has a second confidence value which is greater than the first confidence value.

8. A computer program product, comprising:
a computer-readable, tangible storage device; and
a computer-readable program code stored in the computer-readable, tangible storage device, the computer-readable program code containing instructions that are executed by a central processing unit (CPU) of a computer system to implement a method of processing an image, the method comprising the steps of:
- the computer system determining a category specifying characteristics of a shape of a license plate of a vehicle;
- based on the category specifying the characteristics of the shape of the license plate, the computer system determining characteristics of objects in the image match the characteristics of the shape of the license plate;
- the computer system determining the image includes the license plate and an identifier included in the license plate;
- the computer system determining a category specifying characteristics of an order of alphanumeric characters in the identifier, the order required to be a characteristic of identifiable license plates;
- based on the category specifying the characteristics of the order of the alphanumeric characters in the identifier, the computer system determining characteristics of the objects in the image do not match the characteristics of the order of the alphanumeric characters in the identifier;
- based on the characteristics of the objects in the image not matching the characteristics of the order of the alphanumeric characters in the identifier, the computer system determining the image does not include an identifiable license plate; and
- in response to the step of determining the image does not include the identifiable license plate, the computer system determining the image is invalid and bypassing a manual character recognition process for determining identifiers on license plates.

9. The computer program product of claim 8, wherein the method further comprises the steps of:
- the computer system determining the category further specifying characteristics of a shape of a second license plate of a second vehicle;
- based on the category specifying the characteristics of the shape of the second license plate, the computer system determining characteristics of objects in a second image match the characteristics of the shape of the second license plate;
- based on the characteristics of the objects in second image matching the characteristics of the shape of the second license plate, the computer system determining the second image includes a second identifiable license plate;
- in response to the step of determining the second image includes the second identifiable license plate, the computer system determining the shape of the second license plate includes a plurality of alphanumeric characters;
- the computer system determining one or more alphanumeric characters included in the plurality of alphanumeric characters are not identifiable; and
- in response to the step of determining the one or more alphanumeric characters are not identifiable, the computer system sending the second image to a manual character recognition process for identifying the one or more alphanumeric characters.

10. The computer program product of claim 9, wherein the method further comprises the steps of:
- subsequent to the step of sending the second image to the manual character recognition process for identifying the one or more alphanumeric characters, the computer system receiving an indication that the second image is valid, receiving an identifier included in the second license plate, and receiving a first confidence value of the identifier resulting from the manual character recognition process for identifying the one or more alphanumeric characters;
- the computer system receiving metadata specifying a characteristic of the second image, the characteristic of the second image selected from the group consisting of a charging point at which a camera captured the second image, a traffic lane in which the second vehicle was traveling as the camera captured the second image, an identification of the camera that captured the second image, a time at which the camera captured the second image, a date on which the camera captured the second image, and the received first confidence value;
- the computer system updating another category with the characteristic of the second image specified by the received metadata;
- the computer system receiving a third image including the second license plate;
- the computer system determining the third image has a characteristic that matches the characteristic of the second image specified by the received metadata; and
- based on the third image having the characteristic that matches the characteristic of the second image specified by the received metadata, the computer system determining the identifier of the second license plate in the third image has a second confidence value which is greater than the first confidence value.

* * * * *